Patented Oct. 27, 1953

2,657,164

UNITED STATES PATENT OFFICE 2,657,164

CHLORINATED CAMPHOR AND FENCHONE AS INSECTICIDES

George Allen Buntin, Wilmington, Del., assignor to Hercules Powder Company, Wilmington, Del., a corporation of Delaware No Drawing. Application September 8, 1950, Serial No. 183,895

6 Claims. (Cl. 167—30)

This invention relates to an insecticidal composition and more particularly to an insecticidal composition containing a chlorinated cyclic terpene ketone as the toxic ingredient.

Among the more commonly used insecticidal toxicants are the naturally occurring products, pyrethrum, rotenone, and nicotine. These natural products have the very great disadvantage in not being uniform in their insecticidal activity. Many synthetic products have been suggested in the past as substitutes for these toxicants; however, they are usually lacking in one respect or another. Particularly they do not usually have a high enough killing power and must be used in concentrations which cause irritation to the user, or if they are sufficiently toxic, they are also toxic to forms of animal life other than insect pests.

Now in accordance with this invention, it has been found that insecticidal compositions containing as a toxic ingredient a chlorinated cyclic terpene ketone, having a chlorine content of from about 50% to about 70%, posses an unusual degree of insecticidal activity. These polychloro cyclic terpene ketones which may be prepared by chlorinating such terpene ketones as camphor, fenchone, etc., having a very high killing power are effective in extremely dilute solutions as insecticidal toxicants.

The following examples will illustrate the preparation of the chlorinated cyclic terpene ketones and the insecticidal activity of compositions containing them. All parts are parts by weight.

EXAMPLE I

One part of commercial camphor dissolved in 5 parts of carbon tetrachloride was placed in the chlorination vessel and exposed to ultraviolet illumination. Chlorine was passed into the agitated mixture at a rate that allowed for maximum absorption of the chlorine. The temperature rose, due to the heat of the reaction, to 62° C. and gradually decreased as the chlorination proceeded to a temperature of about 50° C. After 15 hours of chlorination, samples were taken every 5 to 7 hours, a total of 3 samples being removed.

The carbon tetrachloride was removed from each of these samples by distillation under reduced pressure. A yellow, waxy solid remained in each case. This was dissolved in petroleum ether and the solution was washed with a sodium bicarbonate solution, then with water, and finally was dried over sodium sulfate. The petroleum ether was distilled off under vacuum leaving a yellow, waxy solid which was analyzed for chlorine.

The three chlorinated camphor materials, of different chlorine contents, were tested for their insecticidal activity against houseflies. In this and the following examples, the test for insecticidal activity against houseflies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the official test insecticide which was necessary to give a 30–55% kill and must be within the limits of 0.4 to 0.6 ml. After spraying the insecticide into the chamber, the flies were placed in an observation cage containing a wad of cotton wet with a dilute sugar solution. At the end of 24 hours, the number of dead and moribund flies was counted. All tests were carried out at 80–90° F. and 50–70% relative humidity.

The results of the analysis for chlorine content and of tests made on 0.1% solutions in 80% deodorized kerosene-20% acetone solvent of the above three chlorinated camphor materials are given in the following table. The data are an average of a series of tests made on each solution.

*Bell jar tests on flies*

| Chlorination Time in Hrs. | Percent Chlorine | Percent Dead in 24 Hrs. | O. T. I. Difference |
|---|---|---|---|
| 15 | 48.9 | 93 | +40 |
| 20 | 58.1 | 99 | +46 |
| 27 | 63.4 | 98 | +45 |

A fair degree of knockdown was obtained in each case in the above tests. A 10% solution of each of the above materials gave a 100% kill in each case and a very good knockdown.

EXAMPLE II

A polychlorocamphor containing 68.7% chlorine was prepared by chlorinating camphor for 40 hours at 70° C. as described in Example I. A 1% solution of this polychlorocamphor in 80% deodorized kerosene-20% acetone solvent gave a kill of 100% (an O. T. I. difference of +56) when tested against houseflies by the bell jar method.

EXAMPLE III

One part of fenchone dissolved in 5 parts of carbon tetrachloride was chlorinated by passing chlorine into the agitated solution, which was exposed to ultraviolet light, at a rate that allowed for maximum absorption of the chlorine. Samples were taken at the end of 9, 13, and 21 hours of chlorination. The carbon tetrachloride was removed from each of these samples by distillation under reduced pressure using a nitrogen sparge. A viscous yellow liquid was obtained in each case.

The three chlorinated fenchones, containing 56.4%, 62.2%, and 67.9% chlorine, respectively, were tested for their insecticidal activity against houseflies by the bell jar method. The following results of testing 1% and 2.5% solutions of these materials in deodorized kerosene were obtained.

*Bell jar tests on flies*

| Percent Chlorine | Percent Concentration of Solution | Percent Dead in 24 Hrs. | O. T. I. Difference |
|---|---|---|---|
| 56.4 | 2.5 | 100 | +50 |
|  | 1 | 74 | +24 |
| 62.2 | 2.5 | 100 | +50 |
|  | 1 | 89 | +49 |
| 67.9 | 2.5 | 100 | +50 |
|  | 1 | 72 | +22 |

EXAMPLE IV

One part trichlorocamphor obtained according to the process of Cazeneuve (Compt. Rend., October 13, 1884, vol. 99, pages 609–11) as an easily crystallizing material was dissolved in 5 parts carbon tetrachloride and was chlorinated using ultraviolet light as a catalyst at 70° C. by passing chlorine into the mixture until the product contained 49.8% chlorine. Samples withdrawn during the chlorination were washed with water and then with sodium bicarbonate solution and were recovered by distilling off the solvent. The residues were viscous liquids. They were analyzed for chlorine and as 2% solutions in deodorized kerosene for toxicity to flies. The results were as follows:

| Sample | Chlorine | 24 Hr. Kill (Percent) |
|---|---|---|
| Trichlorocamphor | 43.3 | 0 |
| Chlorinated Trichlorocamphor | 45.2 | 0 |
| Do | 47.0 | 4.1 |
| Do | 49.8 | 42.2 |

Any chlorinated cyclic terpene ketone containing from about 50% to about 70% chlorine may be used as the toxic ingredient of the insecticidal compositions of this invention. Cyclic terpene ketones which may be chlorinated to form the toxic ingredient of these insecticidal compositions are camphor, fenchone, isofenchone, carvone, etc. The polychloro cyclic terpene ketones such as polychlorocamphor may be a single compound or a mixture of polychlorocamphors which has an average chlorine content of from about 50% to about 70%. This corresponds to an average of about 4 to 10 chlorine atoms per molecule of terpene ketone.

The polychloro cyclic terpene ketones of this invention are of unknown structure. They are made by chlorination of the terpene ketone under a wide range of chlorination conditions. The chlorination of camphor is known to produce a trichlorocamphor of unknown constitution which is crystalline and is, therefore, believed to be chiefly a single position isomer. This product, on further chlorination is, however, a noncrystalline material and is, therefore, believed to be a mixture of polychloro cyclic terpene ketone isomers. Similar poyichloro terpene ketone mixtures have been prepared under a wide range of chlorination conditions and the toxicity to flies has been found to be relatively independent of the method of chlorination, but to be dependent entirely upon the degree of chlorination.

The polychloro terpene ketones are prepared by chlorination of the terpene ketone at a temperature below the decomposition point of the product. Most chlorinated terpene ketones tend to decompose at their boiling point and the chlorination is, therefore, carried out below the boiling temperature of the material being chlorinated. The temperature of chlorination is generally kept below about 150° C. and is ordinarily carried out above 0° C., since at low temperatures the rate of chlorination is impractically slow. The usual range of chlorination temperature is 50 to about 100° C. While initial stages of chlorination may be carried out at low temperatures, the final stages of chlorination must be carried out in the range of 50–100° C. in order to reach a sufficiently high chlorine content to reach the desired toxicity.

The chlorination may be carried out in the presence or absence of catalysts but the reaction rate is impractically slow, especially toward the end of the chlorination, in the absence of catalysts and catalysts are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use other free radical formers such as lead alkyls and organic peroxides including peroxy acids and peroxy anhydrides. Examples of the latter are well known in the chlorination art and include benzoyl peroxide and acetyl peroxide. Only a catalytic amount of catalyst, sufficient to accelerate the reaction, is needed and, if used up in the process, more will be added as required. More than a catalytic amount will not ordinarily be added at one time since better control is obtained by using only as much as is necessary for attaining the desired rate of chlorination. The preferred catalysts are the organic peroxides. The amount of catalyst used in the chlorination will ordinarily be within the range of about 0.001 to 5% based upon the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the terpene ketone may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of terpene ketone being chlorinated and is generally within the range of 1–5 volumes per volume of terpene ketone.

The chlorinated terpene ketone may be readily purified and freed of catalysts by washing with water until sufficiently free of hydrochloric acid and then washing with mild alkali until neutral. The catalysts are ordinarily completely removed by this procedure. After purification, the solvent is removed by distillation, preferably under reduced pressure.

The insecticidal compositions of this invention are produced by admixing the polychloro terpene ketone having a chlorine content within the range of about 50% to about 70% with a suitable adjuvant which is an inert material to facilitate the mechanical distribution of the polychloro terpene ketone toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the polychloro terpene ketone. Surface-active dispersing agents are used in admixture with the polychloro terpene ketones to promote the spreading of the toxic material so as to improve its effectiveness. They are used in both aqueous sprays and dusts. Hydrocarbon solvents such as deodorized kerosenes are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280–287) for use with known insecticides and includes soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents which are useful in the compositions of this invention are the omega-substituted polyethylene glycols of relative long-chain length, particularly those in which the omega substituent is aryl, alkyl, or acyl. Compositions of the polychloro terpene ketone toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the polychloro terpene ketone mixtures admixed with these inert materials which facilitate the mechanical distribution of the polychloro terpene ketone in accordance with this invention are those containing the above-listed surface-active dispersing agents and hydrocarbon solvent dispersing agents.

The amount of polychloro terpene ketone in the composition with the inert material which facilitates the mechanical distribution of the toxicant will depend upon the type of inert material and the use to which it is to be put. The compositions will generally contain less than about 30% polychloro terpene ketone. Agricultural dusts may contain 40–60% polychloro terpene ketone as concentrates and will generally contain 10–30% polychloroterpene ketone in the form as used. Household sprays will contain from 0.1 to 10% polychloro terpene ketone, preferably about 2.5% in deodorized kerosene, but concentrates may contain 25–90% polychloro terpene ketone. Agricultural sprays will, likewise, contain 0.1 to 10% of the polychloro terpene ketone. Aqueous emulsions will contain sufficient surface-active dispersing agent to maintain an emulsion of the polychloro terpene ketone during the spraying process. Concentrates from which emulsions are made may contain 25–90% polychloro terpene ketone along with the surface-active dispersing agent.

For many purposes, it may be desirable to use the chlorinated terpene ketone in combination with other insecticidal toxicants. Many toxicants have a very high knockdown in relatively dilute solutions, but higher concentrations must be used in order to obtain the desired degree of kill. Due to the very high degree of killing power which the chlorinated terpene ketones possess, these compounds may be added to such toxicants, thereby enabling the use of much more dilute solutions than would otherwise be possible. Toxicants with which these chlorinated terpene ketones may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

This application is a continuation-in-part of application Serial No. 676,589, filed June 13, 1946, now abandoned.

What I claim and desire to protect by Letters Patent is:

1. An insecticidal composition comprising a polychloro bicyclic terpene ketone having a chlorine content within the range of about 50% to about 75% chlorine obtained by chlorinating a terpene ketone, selected from the group consisting of camphor and fenchone, in an inert solvent with chlorine gas in the presence of a free radical-forming chlorination catalyst at a temperature in the range of 50–100° C. to a chlorine content within said range, and an insecticidal adjuvant as a carrier therefor.

2. An insecticidal composition comprising a polychloro bicyclic terpene ketone having a chlorine content within the range of about 50% to about 75% chlorine obtained by chlorinating camphor in an inert solvent with chlorine gas in the presence of a free radical-forming chlorination catalyst at a temperature in the range of 50–100° C. to a chlorine content within said range, and an insecticidal adjuvant as a carrier therefor.

3. An insecticidal composition of claim 2 in which the insecticidal adjuvant is a surface-active dispersing agent.

4. An insecticidal composition of claim 2 in which the insecticidal adjuvant is a hydrocarbon solvent dispersing agent.

5. An insecticidal composition of claim 2 in which the insecticidal adjuvant is a powdered clay.

6. An insecticidal composition of claim 2 in which the insecticidal adjuvant is an aqueous emulsion with a surface-active dispersing agent.

GEORGE ALLEN BUNTIN.

References Cited in the file of this patent

UNITED STATES PATENTS

| Number | Name | Date |
|---|---|---|
| 1,494,101 | Cox | May 13, 1924 |
| 2,351,311 | Alder et al. | June 13, 1944 |
| 2,546,174 | Stonecipher | Mar. 27, 1951 |

OTHER REFERENCES

Plummer, "Dow Diamond," July 1947, pages 1 and 2.

Prill, "Journal American Chem. Soc.," Volume 60, pages 62 and 63, 1947.

Parker et al., University of Delaware, Agr. Expt. Station Bulletin Number 264, Techn., No. 36, entitled, "Toxaphene, A Chlorinated Hydrocarbon With Insecticidal Properties," February 1947.

Desalbres, et al., Chimie & Industrie, Volume 58, Number 5, November 1947.